United States Patent [19]
Bressler

[11] Patent Number: 5,419,539
[45] Date of Patent: May 30, 1995

[54] ELASTOMERIC SHOCK ABSORBER WITH POSITIONING INSERT

[75] Inventor: Ulrich Bressler, Manchester, N.H.

[73] Assignee: Freudenberg-NOK General Partnership, Plymouth, Mich.

[21] Appl. No.: 107,282

[22] Filed: Aug. 16, 1993

[51] Int. Cl.⁶ .............................................. F16F 1/36
[52] U.S. Cl. .................................. 267/292; 267/140; 293/136; 403/14
[58] Field of Search ............... 267/139, 140, 141, 152, 267/153, 292; 293/136; 403/13, 14, 22

[56] References Cited

U.S. PATENT DOCUMENTS

| | | | |
|---|---|---|---|
| 1,872,259 | 8/1932 | Eldridge | 267/292 X |
| 2,596,780 | 5/1952 | Meyers et al. | 267/140 |
| 2,813,712 | 11/1957 | Stanis | 267/292 X |
| 3,343,770 | 9/1967 | Szonn | 267/153 X |
| 4,427,189 | 1/1984 | Kimura et al. | 267/139 |

FOREIGN PATENT DOCUMENTS

| | | | |
|---|---|---|---|
| 1285338 | 8/1972 | United Kingdom | 267/153 |
| 2081653 | 2/1982 | United Kingdom | 293/136 |

Primary Examiner—Josie A. Ballato
Attorney, Agent, or Firm—Dinnin & Dunn

[57] ABSTRACT

A novel elastic bumper assembly for an automotive vehicle or the like, which comprises an elastic bumper member adapted for repetitive cushioning impact, the elastic bumper member being formed of an elastomeric material, which contains imbedded therein a relatively stiff high strength insert member, with the insert member having a fastener device extending outwardly therefrom, and a cup-like holder member adapted to receive and hold one end of the bumper member which has the insert member and fastener protruding therefrom, such that the fastener member protrudes through the holder member and is then securely attached to a supporting position on the automotive vehicle axle or frame.

15 Claims, 1 Drawing Sheet

ELASTOMERIC SHOCK ABSORBER WITH POSITIONING INSERT

BACKGROUND OF THE INVENTION

This invention relates to elastic bumper devices suitable for use in automotive vehicles such as light trucks, vans and the like; and it also relates to an elastic bumper device for other opposed structural members which may be subject to rapid movements or vibrations, wherein an elastic bumper is desirable for shock absorption.

In the past, various types of elastic bumper devices have been utilized on automotive vehicles such as trucks and vans to absorb or resist shocks which are caused when the axle of the vehicle is subjected to rapid or severe bumps causing the vehicle axle to be moved upwardly toward the frame or body of the vehicle. While prior devices of this type have been utilized, there has been a significant difficulty in maintaining proper positioning and location of the bumper device, and at the same time preventing the bumper device from being damaged, permanently distorted, or dislodged from its desired position. For example, in one earlier attempted design an elastic bumper was simply snapped into a metal cup which was later threaded or fastened to the frame of the vehicle; however it was found that sudden severe shocks, or bumps encountered by the vehicle, or side forces encountered by the vehicle, would cause this earlier bumper device to be dislodged from its cup and thus become inoperative.

Accordingly a primary object of the present invention is to provide a novel and highly advantageous elastic bumper assembly for use on automotive vehicles, wherein the bumper assembly is utilized to lessen or prevent excessive shocks between the frame and axle of the vehicle.

Another object of the present invention is to provide a novel elastic bumper assembly which is very economical to produce and which provides durable long-time operating characteristics under extended vehicle usage.

Another object of the present invention is to provide a novel and efficient elastic bumper device which is uniquely adapted for repetitive cushioning of impacts directed between the axle and frame or body members of the automotive vehicle.

Still another object of the invention is to provide a three-piece elastic bumper device which is economical to manufacture and which provides excellent operating characteristics under extended heavy duty usage applications.

Other objects, features and advantages of the present invention will become apparent from the subsequent description and the appended claims, taking in conjunction with the accompanying drawings.

SUMMARY OF THE INVENTION

Figure 1:
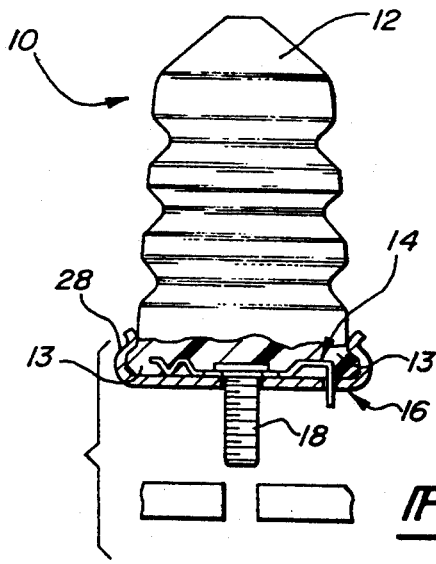
FIG. 1 illustrates an elastic bumper assembly in accordance with the invention, which is shown partly in cross-section.
Figure 2:
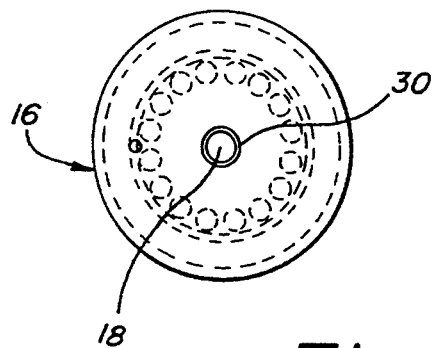
FIG. 2 shows a bottom view of FIG. 1.
Figure 3:
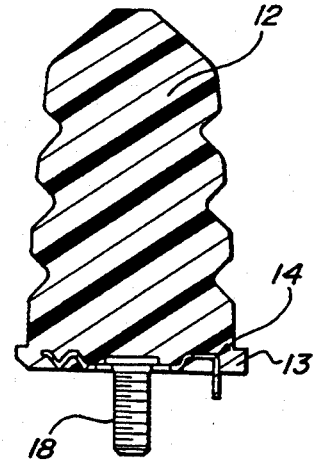
FIG. 3 is a cross-sectional view showing the elastic bumper with an insert member molded in place within the bumper.

Briefly stated, this invention involves an elastic bumper assembly for an automotive vehicle or the like, said assembly comprising: an elastic bumper member adapted for repetitive cushioning impact, said elastic bumper member being formed of a material selected from at least one of the group consisting of solid and foamed elastomeric materials, a relatively stiff high strength insert member molded in to one end of said elastic bumper member, said insert member having a fastener device extending outwardly therefrom and at least two or more irregular shapes also being formed in the insert member to facilitate a strong mechanical interlock between the bumper member and the insert member molded therein, a cup-like holder member adapted to receive and hold said one end of the bumper member which has the insert member therein, said fastener device being operative such that it protrudes through the holder member and is securely attached to a support member which acts to position the bumper assembly in its operative position.

DESCRIPTION OF BEST MODE AND PREFERRED EMBODIMENTS

The drawing FIGS. 1-8 illustrate the elastic bumper assembly 10 of the invention. In these drawings like numerals indicate like elements. The bumper assembly 10 is specially constructed of three elements, which are uniquely complementary with one another, namely a shock absorbing bumper element 12, an insert member 14, and a cup-like holder member 16. As will be explained hereinafter, the three members cooperatively function with one another to solve the problems encountered with prior devices in the field.

Figure 4:
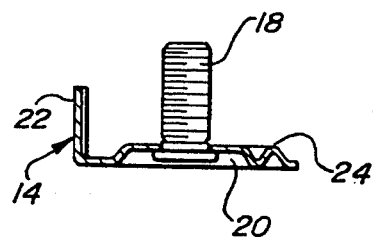
FIG. 4 is a cross-sectional view of the insert member itself.
Figure 5:
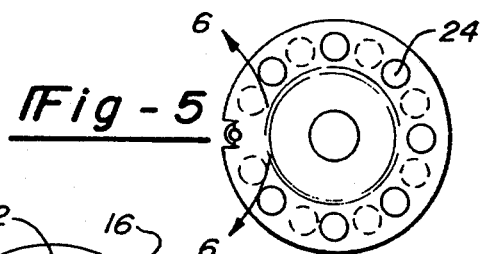
FIG. 5 is a top view of FIG. 4 showing the insert member.
Figure 6:
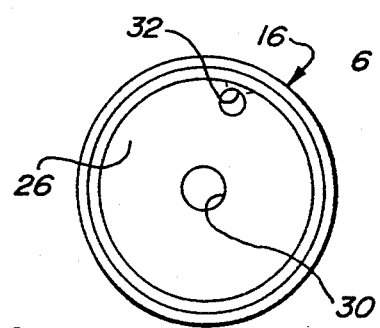
FIG. 6 is an enlarged view showing the tab or locator member from the area of the circle designated "6" in FIG. 5.

In particular the insert member 14, shown more specifically in FIGS. 4, 5, and 6, is comprised of a threaded fastener portion 18, a disk-shaped (or oblong) portion 20, and a locator tab or projection 22. The disk portion 20 of the insert 14 can suitably contain dimples 24, or other irregular interlocking shapes in place of the dimples such as holes, apertures or punch marks, the purpose of which is to assist in locating and interlocking the insert member 14 when it is molded into (and thereby interlocked within) the bumper material 12.

Figure 7:
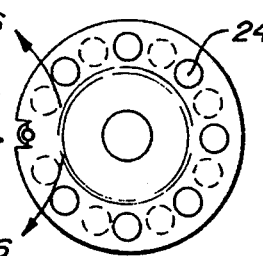
FIG. 7 is a top view of the holder member.
Figure 8:
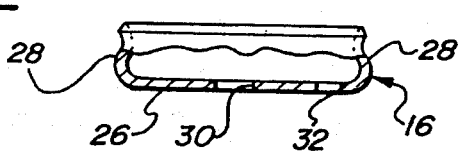
FIG. 8 is a cross-section of the holder member.

The cup member or holder member 16 is more specifically shown in FIGS. 7-8. The holder member 16 is comprised of a generally disc-shaped (or oblong) bottom portion 26 which is generally co-extensive with the disc-shaped (or oblong) portion 20 of the insert member 14. The holder member or cup member 16 also contains curved walls 28 which function to provide a seating location for positioning of the bumper member 12 and its molded-in insert member 14 within the cup member 16. This is more clearly shown in the view of FIG. 1 wherein the bumper 12 and insert 14 are shown positioned within the cup member 16. The cup or holder member 16 also contains a central aperture 30 through which the fastener device 18 protrudes, thus enabling the entire bumper assembly to be securely fastened to either the axle member or frame member of the automotive vehicle on which the bumper assembly is being utilized. The holder member 16 also includes a clearance hole or aperture 32 through which the locator tab or locator projection 22 (FIG. 6) extends for purposes of reliably seating and positioning the bumper 12 within the assembly, prior to its being fixedly positioned on the axle or frame member of the vehicle. The cup-like holder member 16 is also used as an emergency end stop for wheel travel. This situation might occur when the vehicle hits a pot hole and a wheel is pushed violently upwards towards the automobile frame.

It will also be noted that the bumper material 12 contains a specially formed peripheral flange portion 13, which is co-extensive with and fits within the curved portion 28 of the cup member 26. This peripheral projection 13 serves to uniquely anti securely position the bumper 12 within the cup member 26 for actual operating usage of the bumper assembly on the automotive vehicle.

It is important to recognize that the bumper assembly of this invention utilizes the imbedded insert member 14 which has been molded into the elastic bumper material 12 (during the molding thereof) such that it is strongly mechanically interlocked with the elastic bumper material 12. The insert which carries the mounting bolt 18 and the tab member 22 as a locator and anti-rotation device, has been found to function extremely advantageously under actual operating conditions, based on this unique construction. The sub-assembly of bumper 12 and insert 14 is thus fixedly secured within the cup or holder member 16 due to the interlocking fit between the peripheral portion 13 and the curved wall portion 28 of the cup member 16. Through usage of this special overall construction it has been discovered that the bumper cannot be dislodged from its secure positioning because it is firmly trapped between its internal insert member 14 and the mounted cup 16, which is fixedly secured to either the vehicle axle or vehicle frame through usage of the threaded bolt member 18. In prior designs the elastic bumper material (i.e., the bumper element itself) was easily dislodged from the assembly simply by significant side loads being applied thereto or by the application of numerous bumps or shocks received by the prior bumper designs.

It should be understood, in accordance with the invention herein, that the bumper material 12 can be molded from any number of different flexible elastomeric materials: such as rubber, solid or foamed elastomers, urethanes, and flexible resilient plastic materials. In addition the bumper assembly 10, for positioning in its operative position, may be fastened to either the axle portion (not shown) of the vehicle, or to a frame or body member (not shown) of the vehicle. In either fastened position, the bumper assembly is located such that it will provide cushioning against impacts between the axle and frame, e.g., when a heavy bump or pothole, etc., is encountered by the moving vehicle.

While it will be apparent that the preferred embodiments of the invention disclosed are well calculated to fulfill the objects, benefits, and advantages of the invention, it will be appreciated that the invention is susceptible to modification, variation and change without departing from the proper scope or fair meaning of the subjoined claims.

What is claimed is:

1. An elastic bumper assembly for an automotive vehicle, said assembly comprising:

an elastic bumper member adapted for repetitive cushioning against impacts, said elastic bumper member being formed of a material selected from at least one of the group consisting of solid and foamed elastomeric materials, a relatively stiff high strength insert member molded into one end of said elastic bumper member, said insert member having
  a fastener device extending outwardly therefrom and at least two or more interlocking structures also being formed in the insert member to facilitate a strong mechanical interlock between the bumper member and the insert member;

a cup-like holder member adapted to receive and hold said one end of the bumper member which has the insert member molded and interlocked therein, said holder member having a first aperture and a second aperture;

said fastener device being operative such that it protrudes through the holder member and is securely attached to a support member which acts to position the bumper assembly in its operative position;

said insert member includes a locator projection which extends through said second aperture in a base portion of the holder member and rotationally positions the insert member relative to the holder member.

2. The bumper assembly of claim 1 wherein,
said holder member includes a curled peripheral portion which wraps around a peripheral flange portion of said one end of the bumper member to assist in securely fastening the bumper member within the holder member;
and said insert member being formed of metal.

3. The bumper assembly of claim 2 wherein,
said interlocking structures are comprised of a plurality of indent means formed in the insert member, said indent means being operative to assist in supporting and interlocking the bumper member.

4. The bumper assembly of claim 1 wherein,
said fastener device is a threaded fastener.

5. An elastic bumper assembly for an automotive vehicle, said assembly comprising:

an elastic bumper means adapted for repetitive cushioning of impacts, said elastic bumper means being formed of a material selected from at least one of the group consisting of solid and foamed elastomeric materials, a relatively stiff high strength insert means molded into one end of said elastic bumper means, said insert means having
  a fastener device extending outwardly therefrom and at least two or more interlocking structures also being formed in the insert means to facilitate a strong mechanical interlock between the bumper means and the insert means, a holder means adapted to receive and hold said one end of the bumper means which has the insert means molded therein, said holder means having a first orifice and a second orifice, said fastener device being operative such that it protrudes through the holder means and is securely attached to a support member which acts to position the bumper assembly in its operative position;

said insert means includes a locator projection which extends through said second orifice in a base portion of the holder means and rotationally positions the insert means relative to the holder means.

6. The bumper assembly of claim 5 wherein,
said holder means includes a curled peripheral portion which wraps around a portion of said one end of the bumper means to assist in securely fastening the bumper means within the holder means.

7. The bumper assembly of claim 6 wherein,
said interlocking structures are comprised of a plurality of indent means formed in the insert means, said indent means being operative to assist in supporting and interlocking the bumper means.

8. The bumper assembly of claim 7 wherein, said fastener device is a threaded fastener.

9. The bumper assembly of claim 7 wherein, the holder means is fastened to an axle member or a frame member of the automotive vehicle for use as an emergency end stop for wheel travel.

10. An elastic bumper assembly, said assembly comprising:
- an elastic bumper member adapted for repetitive cushioning against impacts, said elastic bumper member being formed of a material selected from at least one of the group consisting of solid and foamed elastomeric materials;
- a high strength insert member molded into one end of said elastic bumper member, said insert member having a fastener device extending outwardly therefrom and a plurality of interlocking structures circumferentially located in the insert member to facilitate a strong mechanical interlock between the bumper member and the insert member;
- a cup-like holder member adapted to receive and hold said one end of the bumper member which has the insert member molded and interlocked therein, said holder member having a first aperture and a second aperture;
- said fastener device being operative such that it protrudes through the holder member and is securely attached to a support member which acts to 2position the bumper assembly in its operative position; and
- said insert member includes a locator projection which extends through said second aperture in a base portion of the holder member and rotationally positions the insert member relative to the holder member.

11. The bumper assembly of claim 10 wherein,
said holder member includes a curled peripheral portion which wraps around a peripheral flange portion of said one end of the bumper member to assist in securely fastening the bumper member within the holder member,
and said insert member being formed of metal.

12. The bumper assembly of claim 11 wherein said curled peripheral portion has a S-like cross-section at said holder member ends.

13. The bumper assembly of claim 10 wherein,
said interlocking structures are comprised of a plurality of indent means formed in the insert member, said indent means being operative to assist in supporting and interlocking the bumper member.

14. The bumper assembly of claim 10 wherein,
said fastener device is a threaded fastener.

15. The bumper assembly of claim 10 wherein,
said first aperture is at a center of said holder member.

* * * * *